US008255106B2

(12) United States Patent
Vespasien

(10) Patent No.: US 8,255,106 B2
(45) Date of Patent: Aug. 28, 2012

(54) METHOD FOR CONTROLLING THE REGENERATIVE BRAKING OF A VEHICLE INCLUDING AT LEAST ONE ELECTRIC MOTOR

(75) Inventor: Jean-Marie Vespasien, Choisy-le-Roi (FR)

(73) Assignee: Renault S.A.S., Boulogne-Billancourt (FR)

( * ) Notice: Subject to any disclaimer, the term of this patent is extended or adjusted under 35 U.S.C. 154(b) by 147 days.

(21) Appl. No.: 12/742,782

(22) PCT Filed: Nov. 12, 2008

(86) PCT No.: PCT/EP2008/065418
§ 371 (c)(1),
(2), (4) Date: Jul. 27, 2010

(87) PCT Pub. No.: WO2009/062976
PCT Pub. Date: May 22, 2009

(65) Prior Publication Data
US 2010/0299036 A1    Nov. 25, 2010

(30) Foreign Application Priority Data
Nov. 14, 2007 (FR) ..................................... 07 59028

(51) Int. Cl.
*G06F 17/00* (2006.01)
(52) U.S. Cl. ............ 701/22; 701/70; 180/65.1; 903/903
(58) Field of Classification Search ............ 701/22, 701/70; 303/151, 152; 180/65.1; 903/903, 903/947
See application file for complete search history.

(56) References Cited

U.S. PATENT DOCUMENTS

| 6,120,115 | A | 9/2000 | Manabe |
| 6,459,980 | B1 | 10/2002 | Tabata et al. |
| 7,753,150 | B2 * | 7/2010 | Tamor .................. 180/65.265 |
| 7,801,662 | B2 * | 9/2010 | Kozarekar et al. ............ 701/101 |
| 7,922,265 | B1 * | 4/2011 | Cottrell ..................... 303/152 |
| 8,066,339 | B2 * | 11/2011 | Crombez et al. ............. 303/152 |
| 8,103,397 | B2 * | 1/2012 | Liang et al. ................... 701/22 |
| 2001/0024062 | A1 | 9/2001 | Yoshino |
| 2006/0030979 | A1 * | 2/2006 | Kuang et al. .................. 701/22 |
| 2007/0032926 | A1 * | 2/2007 | Kozarekar et al. ............ 701/22 |
| 2007/0228821 | A1 | 10/2007 | Maki et al. |
| 2008/0243325 | A1 * | 10/2008 | Kozarekar et al. ............ 701/22 |
| 2010/0102622 | A1 * | 4/2010 | Favaretto ....................... 303/152 |
| 2010/0106386 | A1 * | 4/2010 | Krasznai et al. ............... 701/70 |
| 2011/0066345 | A1 * | 3/2011 | Nasu et al. ..................... 701/70 |
| 2011/0172865 | A1 * | 7/2011 | Liang et al. ................... 701/22 |
| 2011/0303498 | A1 * | 12/2011 | Crombez et al. ........... 188/106 P |
| 2011/0304198 | A1 * | 12/2011 | Cottrell ........................... 303/2 |

FOREIGN PATENT DOCUMENTS

| EP | 1 136 310 | 9/2001 |
| JP | 2001 145205 | 5/2001 |

* cited by examiner

*Primary Examiner* — Helal A Algahaim
(74) *Attorney, Agent, or Firm* — Oblon, Spivak, McClelland, Maier & Neustadt, L.L.P.

(57) ABSTRACT

A method for controlling regenerative braking of a vehicle including at least one thermal engine and/or at least one electric motor, including calculating a GMP braking force setpoint at the wheel, including a regenerative braking force, that is independent from a relation between the brake pedal depression and the braking force applied to the wheels by the main brakes of the vehicle.

6 Claims, 6 Drawing Sheets

METHOD FOR CONTROLLING THE REGENERATIVE BRAKING OF A VEHICLE INCLUDING AT LEAST ONE ELECTRIC MOTOR

BACKGROUND

The present invention relates to the control of regenerative braking in a motor vehicle.

More specifically, the subject of the invention is a method for controlling the regenerative braking of a vehicle equipped with a combustion engine and/or with at least one electric motor.

This invention finds applications in any motor vehicle equipped with at least one electric motor and with associated storage means, notably batteries, whether this be a strictly electric vehicle, or hybrid vehicle that comprises a combustion engine associated with at least one electrical machine.

The regenerative braking function is generally decoupled from the vehicle brake pedal. In such cases, the power train (GMP) control system controls the braking effort applied to the wheels by the brake pads to optimize recuperation of energy. Thus, when the driver depresses the brake pedal, the GMP control unit may go so far as to cancel the effort to be applied via the pads (no dissipation of kinetic energy) so as to maximize the recuperation of energy by the electric motor(s).

Publication FR 2 230 515 describes such a system, in which the level of regenerative braking is connected to the extent to which the brake pedal is depressed. More specifically, it is the strength of the current that provides the regenerative braking that is directly dependent on the position of the brake pedal, without taking the condition of the vehicle (speed, battery charge level, etc) into consideration. Now, it may be desirable to alter the recharging current under certain circumstances, particularly when the battery is already at a high level of charge, to avoid damaging it.

Publication US20020030408 describes another method of controlling the regenerative braking of a vehicle, which is modulated according to the braking demand from the driver, and of a balance ratio between front and rear axle assemblies. The conventional braking system is, however, decoupled from this control, thereby increasing the cost of the system. In addition, the way in which the regenerative braking setpoint is calculated does not take account of any engine braking that causes the vehicle to decelerate with the foot off the pedal, and this may lead to discontinuities in the deceleration when switching from a braking phase to a foot-off phase. Drivability can suffer under such conditions.

To sum up, the known methods are unable to optimize electrical energy management in the vehicle and therefore minimize fuel consumption, in the case of a hybrid vehicle, or maximize range in the case of electric vehicles.

BRIEF SUMMARY

It is an aim of the present invention to take regenerative braking into consideration when calculating the power train operating point overall, so as to minimize energy losses associated with braking.

To this end, the invention proposes to calculate a setpoint for the braking force applied by the GMP to the wheels, including the regenerative braking effort, which setpoint is independent of the relationship there is between the degree to which the brake pedal is depressed and the braking effort applied to the wheels by the main brakes of the vehicle.

According to the invention, the additional braking effort provided by the electric motors by way of regenerative braking is simply added to the braking effort applied by the main brakes of the vehicle.

According to one particular embodiment of the invention, the GMP wheel braking setpoint ($Fr\_cons\_brake$) is defined by a relationship such that:

$$Fr\_cons\_brake = Fr\_min\_0 + \beta(brake\_pdl) \cdot (Fr\_min\_1 - Fr\_min\_0),$$

where:
  $\beta$ is a function of the position of the brake pedal, defined for example from the range [0; 100] to the range [0; 1],
  $Fr\_min\_0$ is the minimum effort that can be required of the GMP, and
  $Fr\_min\_1$ is the maximum level, in terms of absolute value, of the regenerative braking.

Thanks to these steps, regenerative braking effort by the electric machines is added to the dissipative braking effort: if the vehicle decelerates too much, the driver lessens his input on the brake pedal, and places less demand on the dissipative braking system.

BRIEF DESCRIPTION OF THE DRAWINGS

Other features and advantages of the present invention will become clearly apparent from reading the following description of one nonlimiting embodiment thereof with reference to the attached drawing in which.

DETAILED DESCRIPTION

Figure 1:
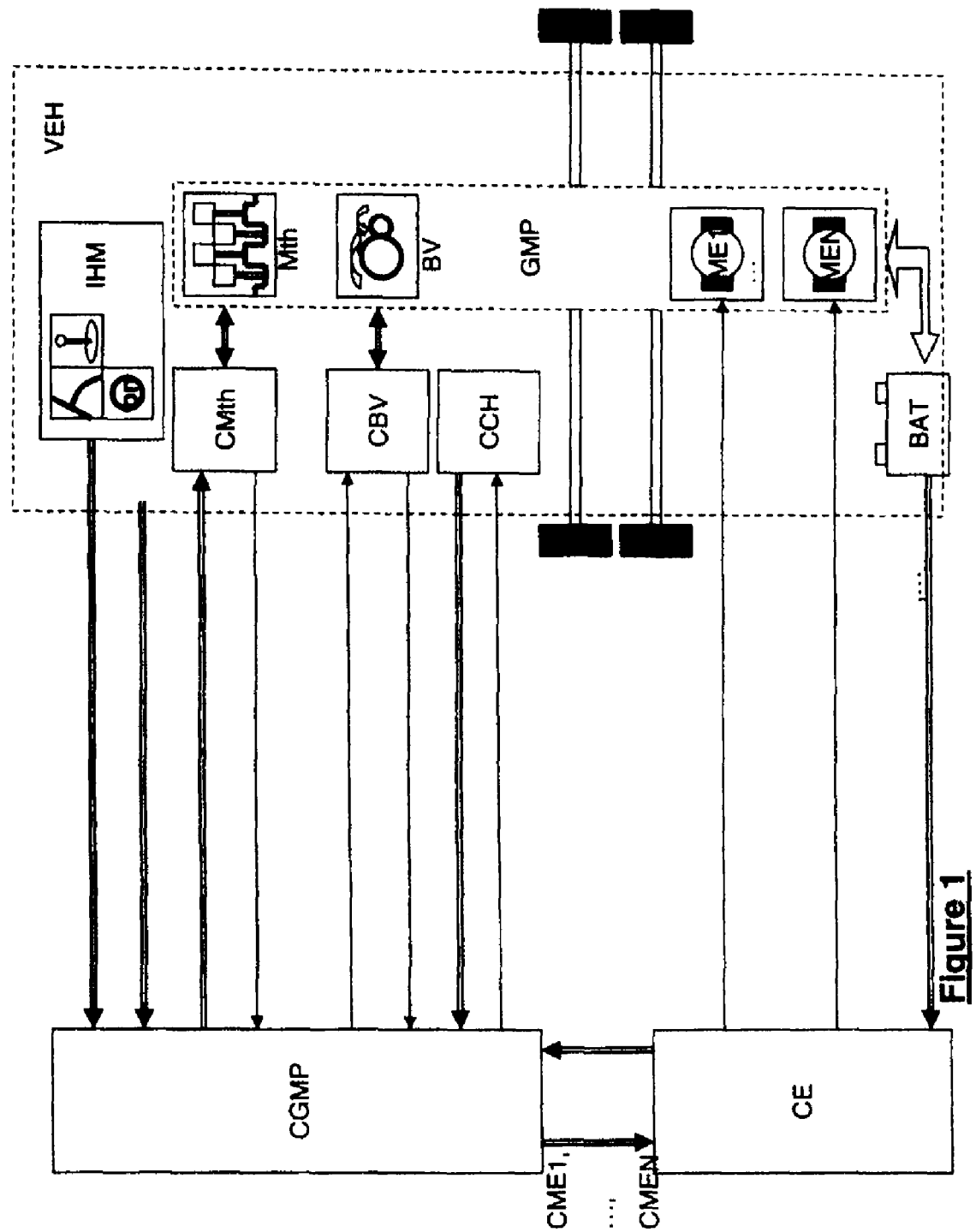
FIG. 1 shows, by way of example, one control architecture for a hybrid vehicle comprising a combustion engine and at least one electric motor.

Across all the figures, it has been chosen arbitrarily to describe a control architecture that is defined in a force at wheels/vehicle speed frame of reference. This representation is aimed at highlighting all of the motive contributions at the vehicle wheels. The idea of force at the wheels is equivalent to that of torque at the wheels. FIG. 1 shows:

a power train control unit (CGMP) the main purpose of which is to formulate setpoints for the actuators: the combustion engine (Mth), the gearbox (BV), the chassis, etc., an electrotechnical control unit (CE) the task of which is to operate the entire electrotechnical system (battery (BAT), inverters, electric motor(s) (ME1 to MEN)) so as to achieve the setpoints received from the CGMP, a combustion engine control unit (CMth) the task of which is to operate, on the engine (Mth), all of the elements needed in order to achieve the setpoint issued by the CGMP, a gearbox control unit (CBV), the task of which is to operate the gearbox (BV) actuators so as to achieve the setpoints from the CGMP, and a chassis control unit (CCH) the task of which is to achieve the setpoints issued by the CGMP.

The GMP control unit takes on the task of interpreting the actions of the driver into setpoints that the actuators can understand. In general, the position of the accelerator pedal is converted into a GMP motor effort setpoint Fr_cons, using the relationship:

$$Fr\_cons=Fr\_min\_0+\alpha(accel\_pdl)*(Fr\_max-Fr\_min\_0),$$

in which:
- Fr_min_0: corresponds to the envelope of the minimal efforts that may be required of the GMP
- Fr_max: corresponds to the maximum envelope of efforts that may be required of the GMP.
- α is a function of the accelerator pedal, defined in the interval [0; 100] to the interval [0; 1] and makes it possible, for example, to build a progressive nature into the way in which the position of the accelerator pedal is interpreted.

For an electric vehicle (with no combustion engine), the envelope Fr_min_0, which characterizes the natural deceleration profile (that is to say the foot-off profile) of the vehicle can be rated to take account of considerations regarding the electrotechnical system (limits on battery power, minimum torque that the electric motor can provide, etc).

With a hybrid vehicle (with a combustion engine), the situation is different, given that natural deceleration may occur with the combustion engine running (for example when the battery is fully charged) or not running (and it is then the electric motor that provides engine braking). To guarantee the driver will experience deceleration that is identical whether the combustion engine is running or switched off, it is possible to choose to define the envelope Fr_min_0 to be as close as possible to combustion engine braking. During deceleration with the combustion engine switched off, it will then be the electric motor that has the task of reproducing the level of engine braking produced by the combustion engine.

Figure 2:
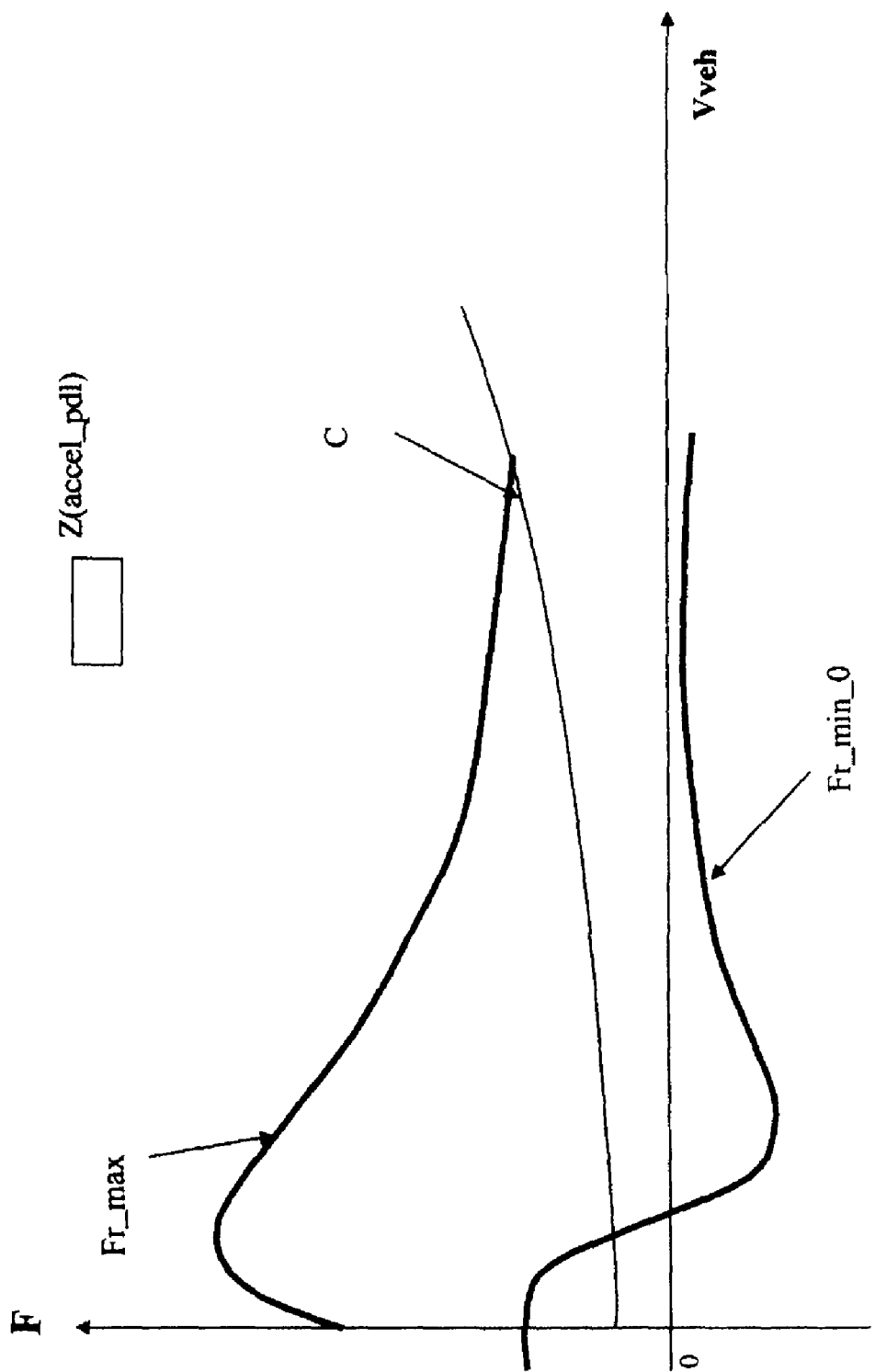
FIG. 2 shows the minimum and maximum envelopes for the effort.

FIG. 2 depicts in a vehicle speed (Vveh)/force at wheels (F) frame of reference, a curve Fr_max (the maximum envelope of the effort required of the GMP), and a curve Fr_min_0 (the minimum envelope with the foot off). These two curves delimit, in that frame of reference, a zone in which the GMP setpoint varies with depression of the accelerator pedal, Z(accel_pdl). The curve representing resistance to forward travel (C) of the vehicle under nominal conditions (flat ground, no wind, etc) will intersect the maximum envelope Fr_max at the end of the setpoint variation zone.

The invention plans to introduce a calculation of the GMP setpoint under braking (Fr_cons_brake) calculated, in the same way as the GMP setpoint for traction (Fr_cons), using the relationship:

$$Fr\_cons\_brake=Fr\_min\_0+\beta(brake\_pdl)*(Fr\_min\_1-Fr\_min\_0),$$

where:
- β is a function of the position of the brake pedal, defined for example from the range [0; 100] to the range [0; 1]; this function makes it possible to rate the level of regenerative braking desired, for a given brake pedal position, and
- Fr_min_1 corresponds to the maximum level (in terms of absolute value) of regenerative braking that it is desirable to accord the vehicle.

Figure 3:
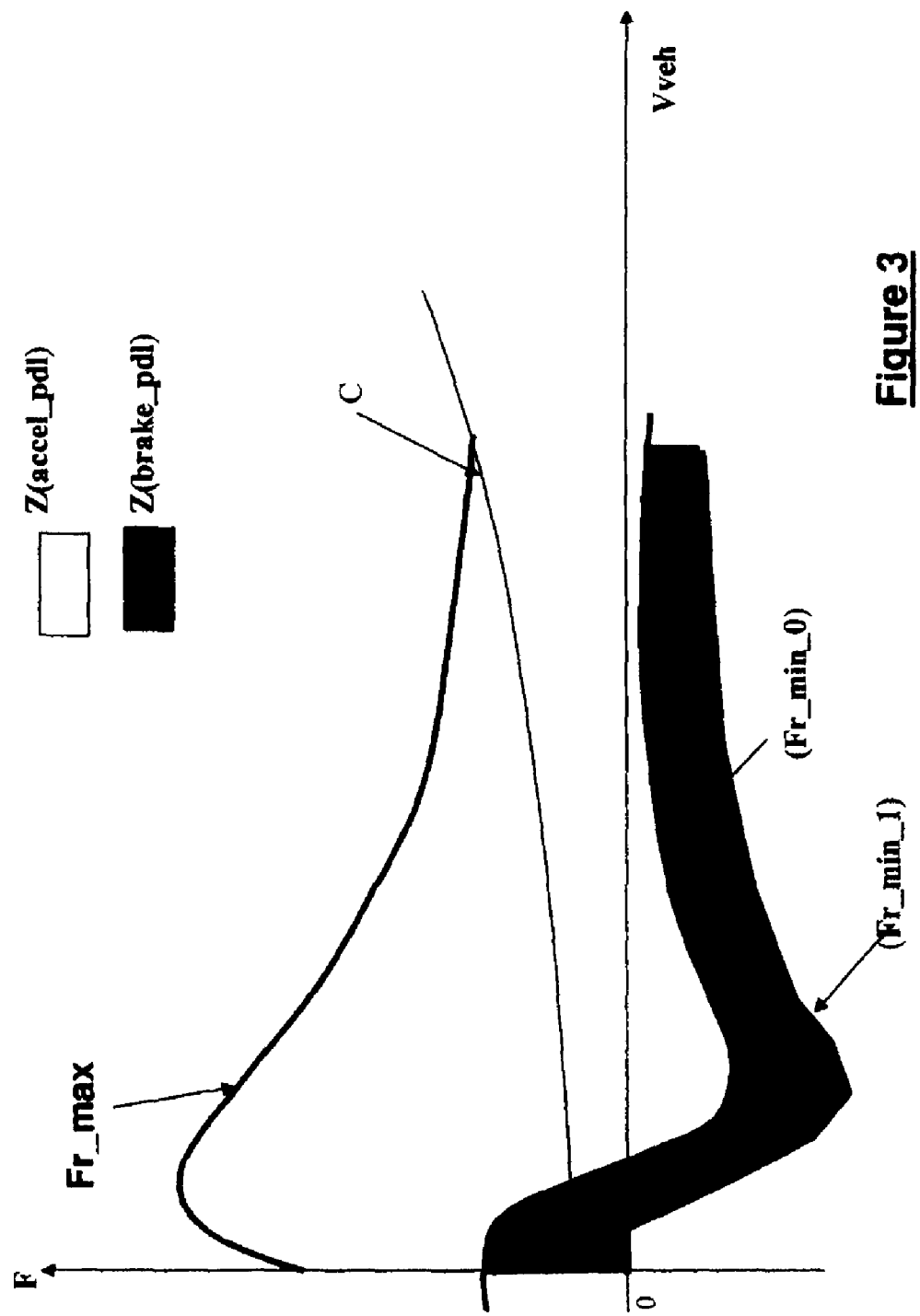
FIG. 3 illustrates the weighting of the regenerative braking, FIG. 4 supplements this illustration.

FIG. 3 illustrates another aspect of the invention which relates to the rating of the maximum level of regenerative braking (Fr_min_1). Superposed on the same curve as FIG. 2 we now also have the maximum envelope for regenerative braking (Fr_min_1) which, with the curve of the minimum envelope with foot off (Fr_min_0) defines a zone in which the GMP setpoint varies with depression of the brake pedal (brake_pdl). Given that regenerative braking can occur only if the status of the electrotechnical system of the vehicle so permits (in particular, if there are no failures, and if the battery charge is not saturated), the level of the regenerative braking is limited to a level such that eliminating it would prove acceptable to the driver. This contrivance means that the driver does not gain the impression of having defective brakes when there is no regenerative braking.

Figure 4:
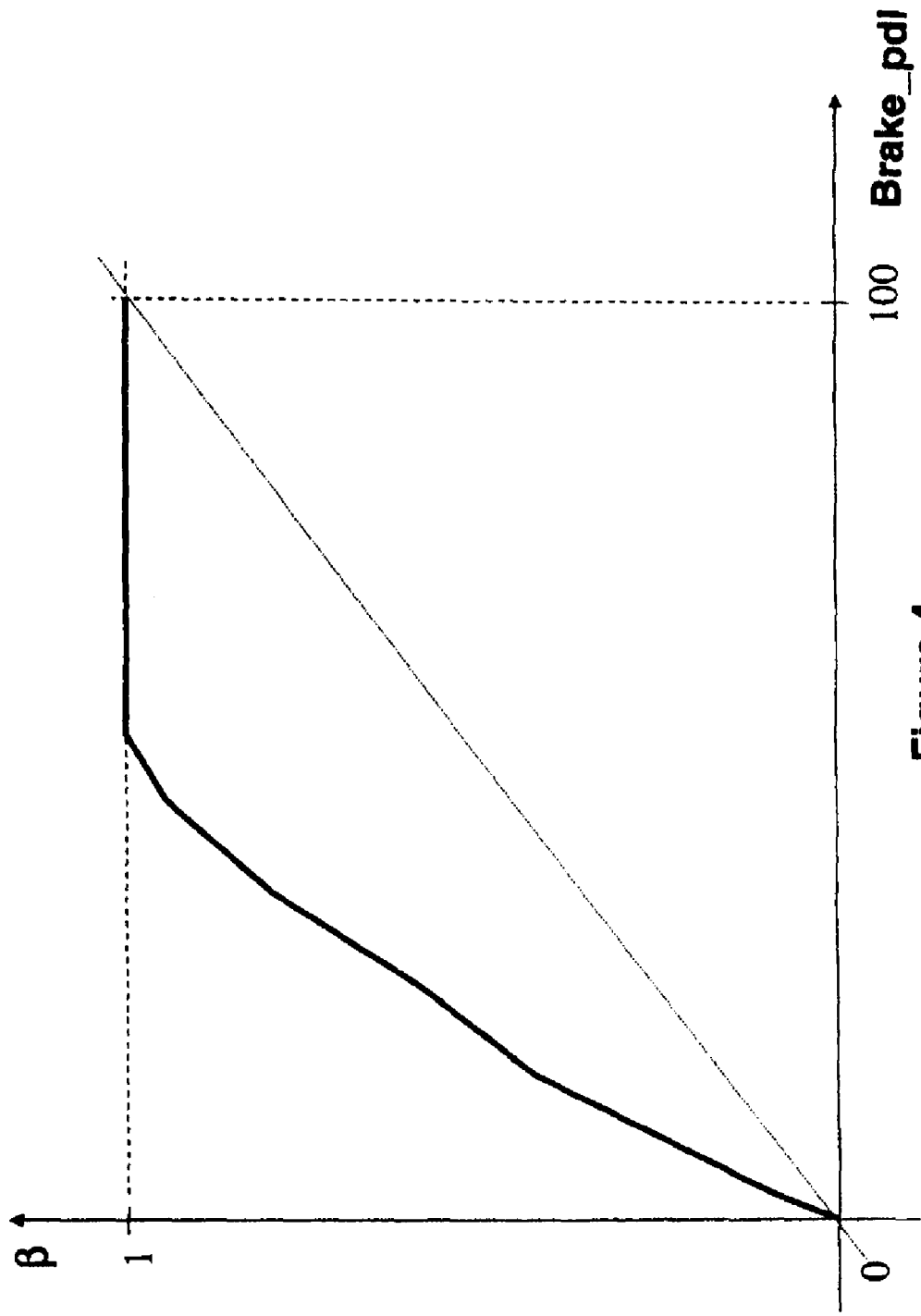

FIG. 4 illustrates one example of the weighting of the function of the position of the brake pedal β=f(brake_pdl). This weighting saturates the function β at the level 1, starting out from an intermediate brake pedal position. It allows all of the authorized regenerative braking to become available once the brake pedal has been depressed beyond a certain point.

In the general case, that is to say taking account of acceleration or braking demands on the corresponding pedals (accel_pdl, brake_pdl), it is thus possible then to calculate the GMP wheel force setpoint Fr_cons as a function of the position of the accelerator and brake pedal, as follows:

$$Fr\_cons(accel\_pdl,brake\_pdl)=Fr\_min\_0+\alpha(accel\_pdl)*(Fr\_max-Fr\_min\_0)+\beta(brake\_pdl)*(Fr\_min\_1-Fr\_min\_0)$$

Once calculated, this setpoint is, however, processed, before being applied, in a second module which (as required) saturates it taking account of electrotechnical considerations (battery charge level, etc) and of chassis considerations, the purpose of all this being to guarantee that the vehicle remains stable under all circumstances.

The wheel force setpoint thus calculated includes the regenerative braking effort but does not modify the relationship between the extent to which the brake pedal is depressed and the braking effort applied to the wheels by the main braking system. For example, in the case of a hydraulic braking system, this strategy makes it possible to maintain a fixed relationship between the position of the brake pedal and the pressure applied by the master cylinder.

Figure 5:
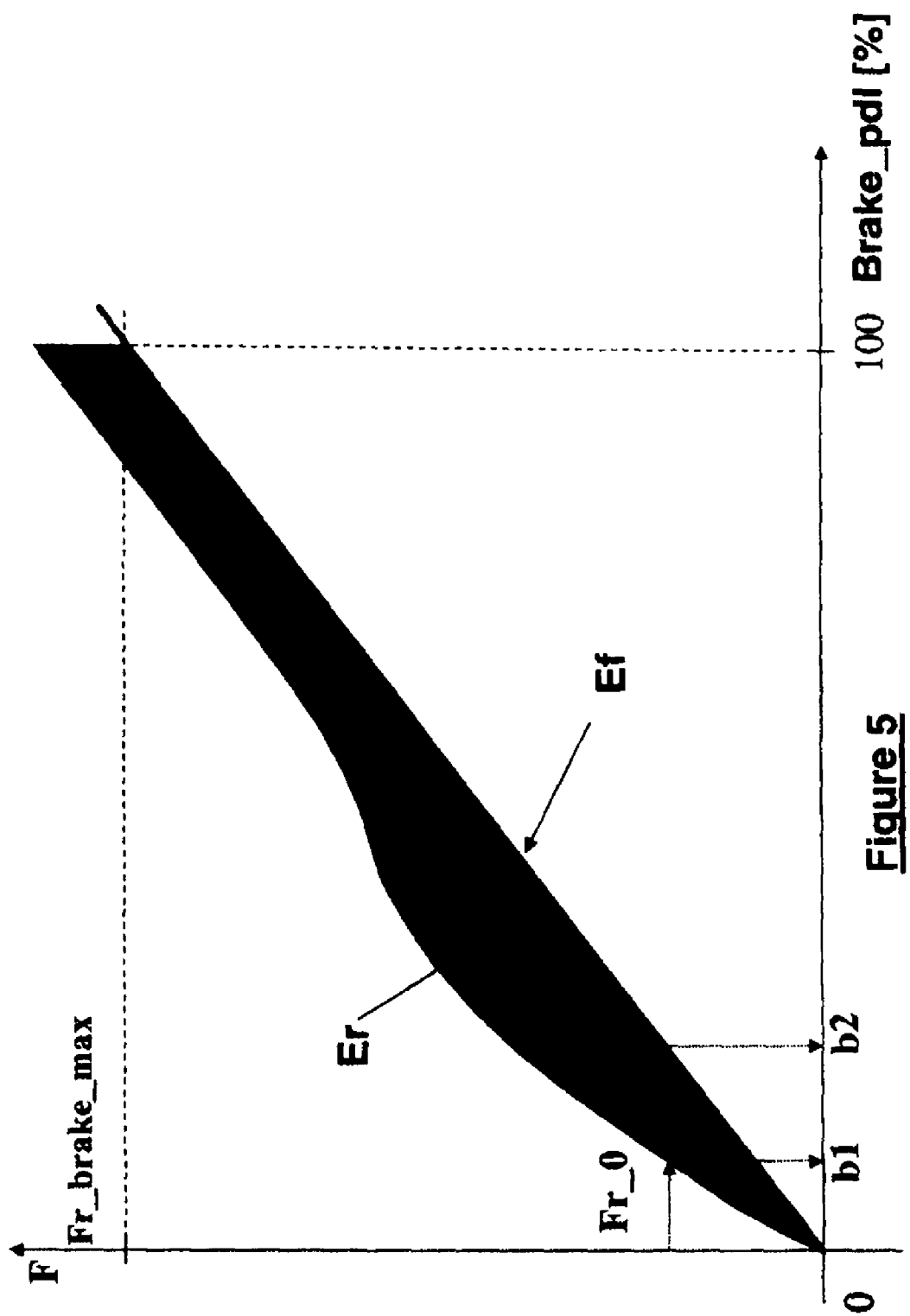
FIG. 5 shows how the dissipative braking and regenerative braking efforts are superposed on one another.

As shown in FIG. 5, which sets out the relationship between the braking force F and the position of the brake pedal (Brake_pdl), the regenerative braking effort (Er) is simply added to the conventional braking effort (Ec) applied by the main brakes of the vehicle. This figure supposes a relationship refined at a given vehicle speed, between the position of the brake pedal brake_pdl and the braking effort applied by the brakes. Thus, as long as regenerative braking can be achieved, less demand is placed on the brakes. Specifically, if, at any given moment, the driver wishes to have braking of amplitude Fr_0 (see FIG. 5), that will correspond to depressing the brake pedal down to the position b1 (with regenerative braking), whereas he would have to depress the same pedal down to the position b2>b1 without the regenerative braking. It is therefore the driver who regulates the braking effort to the desired level.

The invention has many advantages. In particular:
- it allows better recuperation of energy under braking, for a hybrid GMP not equipped with a decoupled braking system,
- it allows regenerative braking control that is practically transparent to the driver who therefore has at his disposal a level of braking that remains substantially constant irrespective of the mode of operation adopted (combustion engine, hybrid or electric),
- it places less demand on the conventional braking system for the same demand for deceleration, making this system more durable, it allows a regenerative braking function to be installed without the need to bear the on-cost of a decoupled braking system, it allows better recharging of the batteries under deceleration (for a system that does not have a decoupled braking system), while at the same time reducing the use of the brakes.

Figure 6:
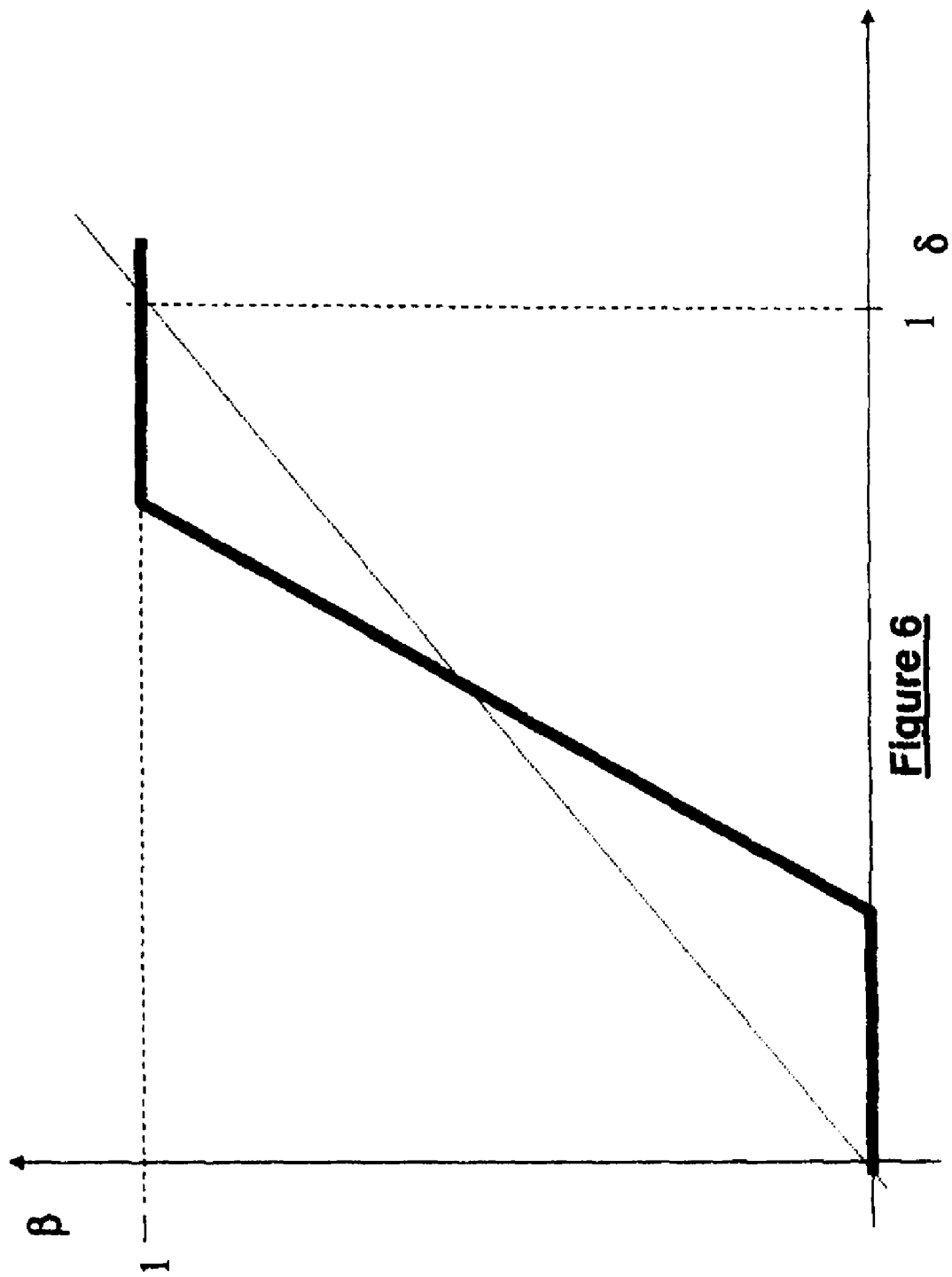
FIG. 6 illustrates an alternative form of the invention.

Aside from these main advantages, the invention makes it possible easily to introduce a "pre-crash braking" function that consists in detecting an emergency braking situation so as to allow immediate braking, even before the brake pedal is depressed. For that, all that is required is for the parameter $\beta[=f(brake\_pdl)]$ to be constructed as a function of an emergency braking indicator $\delta$ lying between 0 (no urgency) and 1 (imminent emergency braking) as indicated in FIG. 6.

The parameter $\beta$ may be a function both of the position of the brake pedal and of the emergency braking indicator, so as to ensure continuity in the regenerative braking. This anticipation makes it possible to reduce the stopping distance of the vehicle while at the same time storing energy.

To sum up, it should be emphasized that the decoupled regenerative braking systems known from the prior art are, in all instances, more expensive than the solution proposed by the invention. The latter is used without modifying the law that connects the position of the brake pedal to the braking effort provided by the brake pads and this, in itself, complies with the safety requirement.

By virtue of the invention, it is possible to apply the highest possible level of regenerative braking, within the limits of what the driver can tolerate at any given time. In addition, there is no longer any need to modify the conventional brake setpoint associated with each position of the brake pedal. The present invention can therefore be applied to a vehicle which, moreover, is fitted with any type of braking.

The invention allows some of the kinetic energy dissipated in the braking phase to be recuperated, without any on-cost associated with the introduction of a decoupled braking system.

Finally, as is indicated above, regenerative braking is now completely transparent to the driver because the regenerative braking setpoint takes into consideration only drivability, with perfect continuity of braking between all driving situations encountered.

The invention claimed is:

1. A method for controlling regenerative braking of a vehicle including a combustion engine and/or at least one electric motor, comprising:

calculating a setpoint for braking force applied by a power train to wheels of the vehicle, including regenerative braking effort, the calculated power train wheel braking setpoint being independent of a relationship between a degree to which a brake pedal of the vehicle is depressed and a braking effort applied to the wheels by main brakes of the vehicle; and applying the breaking force from the power train to the wheels of the vehicle according to the calculated power train wheel braking setpoint, wherein the power train wheel braking setpoint (Fr_cons_brake) is defined by the relationship:

$$Fr\_cons\_brake = Fr\_min\_0 + \beta(brake\_pdl)*(Fr\_min\_1 - Fr\_min\_0),$$

in which:

$\beta$ is a weighting of the regenerative braking as a function of a position of the brake pedal, defined from the range [0; 100] to the range [0; 1], Fr_min_0 is a minimum effort that can be required of the power train (when the brake pedal is not being depressed), Fr_min_1 is a maximum level, in terms of absolute value, of the regenerative braking, and wherein the weighting ($\beta$) of the regenerative braking is set such that all authorized regenerative braking becomes available once the brake pedal has been depressed to an intermediate brake pedal position.

2. The method of controlling regenerative braking as claimed in claim 1, wherein the additional braking effort supplied by the electric motors by regenerative braking is added to the braking effort applied by the main brakes of the vehicle.

3. The method of controlling regenerative braking as claimed in claim 1, wherein the minimum effort (Fr_min_0) is defined as close as possible to the combustion engine braking.

4. The method of controlling regenerative braking as claimed in claim 1, wherein the maximum level of regenerative braking (Fr_min_1) is limited to a predetermined level.

5. The method of controlling regenerative braking as claimed in claim 1, further comprising calculating a power train wheel force setpoint Fr_cons (accel_pdl, brake_pdl) as a function of a position of an accelerator pedal and braking or the position of the braking pedal, using a relationship of type:

$$Fr\_cons(accel\_pdl, brake\_pdl) = Fr\_min\_0 + \alpha(accel\_pdl)*(Fr\_max - Fr\_min\_0) + \beta(brake\_pdl)*(Fr\_min\_1 - Fr\_min\_0),$$

in which:

$\alpha$ is a weighting of an acceleration as a function of the position of the accelerator pedal, defined from the range [0; 100] to the range [0; 1], Fr_max is a maximum effort that can be required of the power train.

6. The method of controlling regenerative braking as claimed in claim 1, wherein the weighting ($\beta$=f(brake_pdl)) of the regenerative braking is also a function of an emergency braking indicator lying between 0 and 1.

* * * * *